United States Patent [19]

Hayashi

[11] Patent Number: 5,889,604
[45] Date of Patent: Mar. 30, 1999

[54] METHOD OF AND APPARATUS FOR DATA COMMUNICATIONS BETWEEN PORTABLE INFORMATION TERMINALS

[75] Inventor: Keiichi Hayashi, Tokyo, Japan

[73] Assignee: NEC Corporation, Tokyo, Japan

[21] Appl. No.: 763,753

[22] Filed: Dec. 11, 1996

[30] Foreign Application Priority Data

Dec. 15, 1995 [JP] Japan ................................. 7-347677

[51] Int. Cl.$^6$ ........................... H04B 10/04; H04B 10/10
[52] U.S. Cl. ......................... 359/181; 359/184; 359/185; 359/142; 359/161
[58] Field of Search .................................. 359/152, 154, 359/142, 181, 184–186, 161; 375/240, 241

[56] References Cited

U.S. PATENT DOCUMENTS 5,075,792 12/1991 Brown et al. .

FOREIGN PATENT DOCUMENTS

525962A2 2/1993 European Pat. Off. .
63-246048 10/1988 Japan .

*Primary Examiner*—Leslie Pascal
*Attorney, Agent, or Firm*—Scully, Scott, Murphy and Presser

[57] ABSTRACT

Data communications are carried out between portable information terminals through infrared radiation with an energy source which may be either a battery in each of the portable information terminals or an external power supply therefor, at a data transmission rate which is relatively low when the portable information terminal is operated by the battery. If the power source is the incased battery, the data transmission rate is switched to a low rate, data to be transmitted are compressed, and the respective numbers of bits "0" and "1" contained in the compressed data are compared with each other. If the number of bits which require a greater amount of electric energy for transmission is greater than the other number of bits, then the value of bits is inverted. Data indicative of the low data transmission rate, the compression of the data, and whether the value of bits has been inverted or not are coded into header data which are added to the compressed data for transmission. The data transmission rate is adjusted, the compressed data are expanded, and the inverted value of bits is inverted back by a controller in response to the header data at the receiver side.

3 Claims, 4 Drawing Sheets

METHOD OF AND APPARATUS FOR DATA COMMUNICATIONS BETWEEN PORTABLE INFORMATION TERMINALS

BACKGROUND OF THE INVENTION

1. Field of the Invention

The present invention relates to a method of and an apparatus for carrying out data communications between portable information terminals, and more particularly to a method of and an apparatus for carrying out data communications between portable information terminals through a wireless communication medium such as infrared radiation with an energy source which may either be a battery of limited capacity housed in each of the portable information terminals or an external power supply of unlimited capacity.

2. Description of the Related Art

One known portable information terminal, as disclosed in Japanese patent application laid-open No. 63-246048, which is used in a wireless signal transmission system which employs a wireless signal such as a radio signal for transmitting data between main and auxiliary units, transmits data at different transmission rates depending on the condition in which the wireless signal is propagated. Such a portable information terminal is usually powered by a battery, and communicates with another terminal through a wireless communication medium such as infrared radiation. Generally, the portable information terminal consumes a large amount of electric energy for wireless communications through infrared radiation, and the incased battery of the portable information terminal has a limited capacity because the portable information terminal is relatively small in size and light in weight. Consequently, the portable information terminal which effects wireless communications through infrared radiation cannot be used continuously for a long period of time due to the limited battery capacity.

The wireless signal transmission system disclosed in the laid-open no. 246048/1985 is capable of increasing the reliability of data transmission by varying the data transmission rate according to the propagation condition of the wireless signal. However, the disclosed wireless signal transmission system gives no solution to prevent the high consumption of the electric energy of the portable information terminal without degrading the efficiency of the data transmission.

SUMMARY OF THE INVENTION

It is an object of the present invention to provide a method of and an apparatus for carrying out data communications between portable information terminals while minimizing the consumption amount of electric energy when the portable information terminal is in operation without degrading the efficiency of data transmission.

To achieve the above object, there is provided in accordance with the present invention a method of carrying out data communications between portable information terminals through infrared radiation with a power source which may be either an incased battery of limited capacity each of the portable information terminals or an external power supply of unlimited capacity, at a data transmission rate which is relatively low when the portable information terminal is operated by the battery, comprising the steps of compressing data to be transmitted from one of the portable information terminals to another portable information terminal if the energy source is the battery, comparing the number of bits "0" contained in the compressed data and the number of bits "1" contained in the compressed data with each other, inverting the value of bits if the number of bits which require a greater amount of electric energy to be consumed for transmission is greater than the other number of bits, transmitting the compressed data together with at least one of data representing that the data have been compressed and whether the value of bits has been inverted or not, from the one of the portable information terminals to the other portable information terminal if the energy source is the battery, and expanding the compressed data and inverting back the inverted value of bits in response to the data at the receiver side information terminal.

The signal representing the modified content of data comprises coded header data added to the compressed data, and receiver side portable information terminal decodes the coded header data.

According to the present invention, there is also provided an apparatus for carrying out data communications between portable information terminals through infrared radiation with an energy source which may be either an incased battery of limited capacity housed in each of the portable information terminals or an external power supply of unlimited capacity therefor, at a data transmission rate which is relatively low when the portable information terminal is operated by the incased battery, comprising a power supply detector for detecting whether the energy source is the battery or the external power supply, means for compressing data to be transmitted from one of the portable information terminals to another portable information terminal if the energy source is the incased battery as detected by the power supply detector, means for comparing the number of bits "0" contained in the compressed data and the number of bits "1" contained in the compressed data with each other, means for inverting the value of bits if the number of bits which require a greater amount of electric energy to be consumed for transmission is greater than the other number of bits, means for transmitting the compressed data together with coded header data representing that the data have been compressed and whether the value of bits has been inverted or not, from the one of the portable information terminals to the receiver side portable information terminal if the energy source is the incased battery, and means for decoding the header data, expanding the compressed data, and inverting back the inverted value of bits in response to the header head at the receiver side portable information terminal.

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 1:
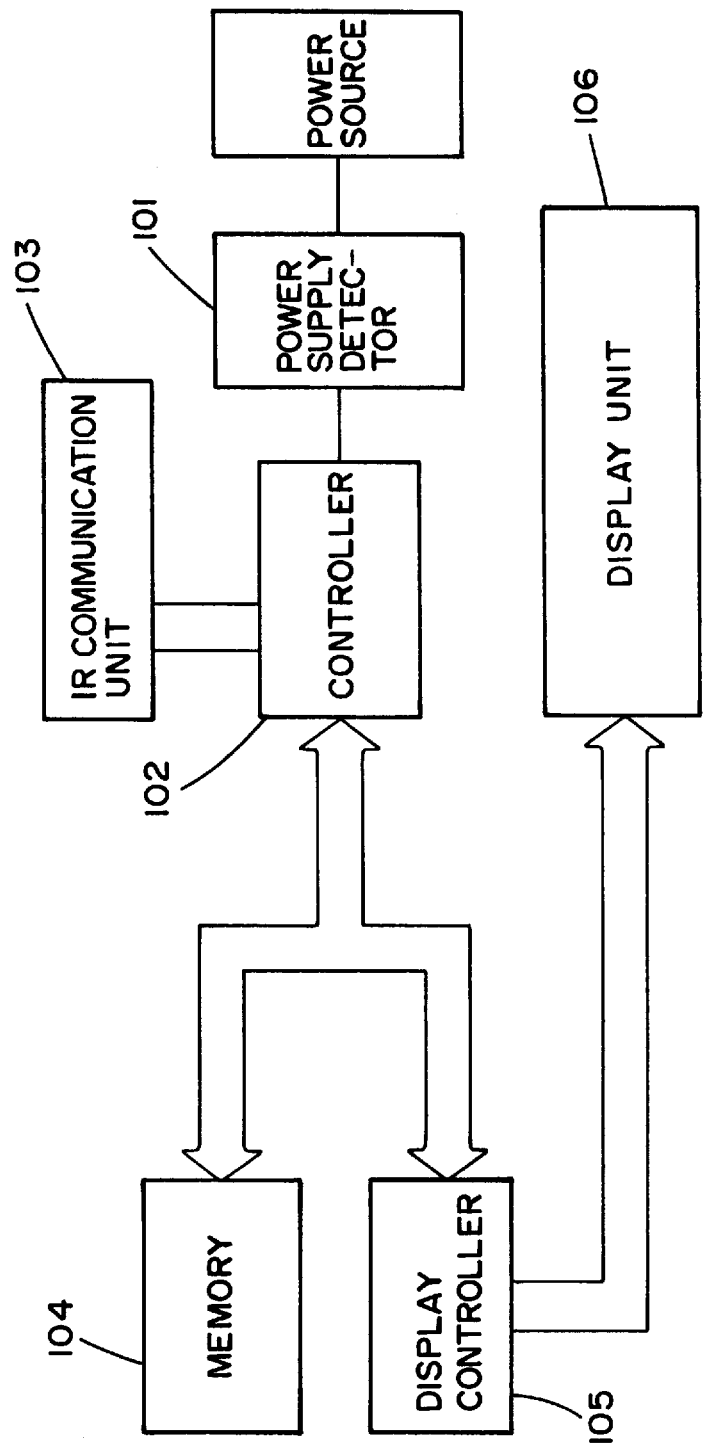
FIG. 1 is a block diagram of a portable information terminal to which a method of carrying out data communications between portable information terminals according to the present invention is applied.

As shown in FIG. 1, a portable information terminal to which a method of carrying out data communications between portable information terminals according to the present invention is applied, generally comprises a power supply detector 101 for detecting the type of a power supply which supplies electric energy to the portable information terminal, a controller 102, an infrared (IR) communication unit 103 for transmitting data to and receiving data from another portable information terminal through infrared radiation, a memory 104, a display controller 105, and a display unit 106.

Figure 2:
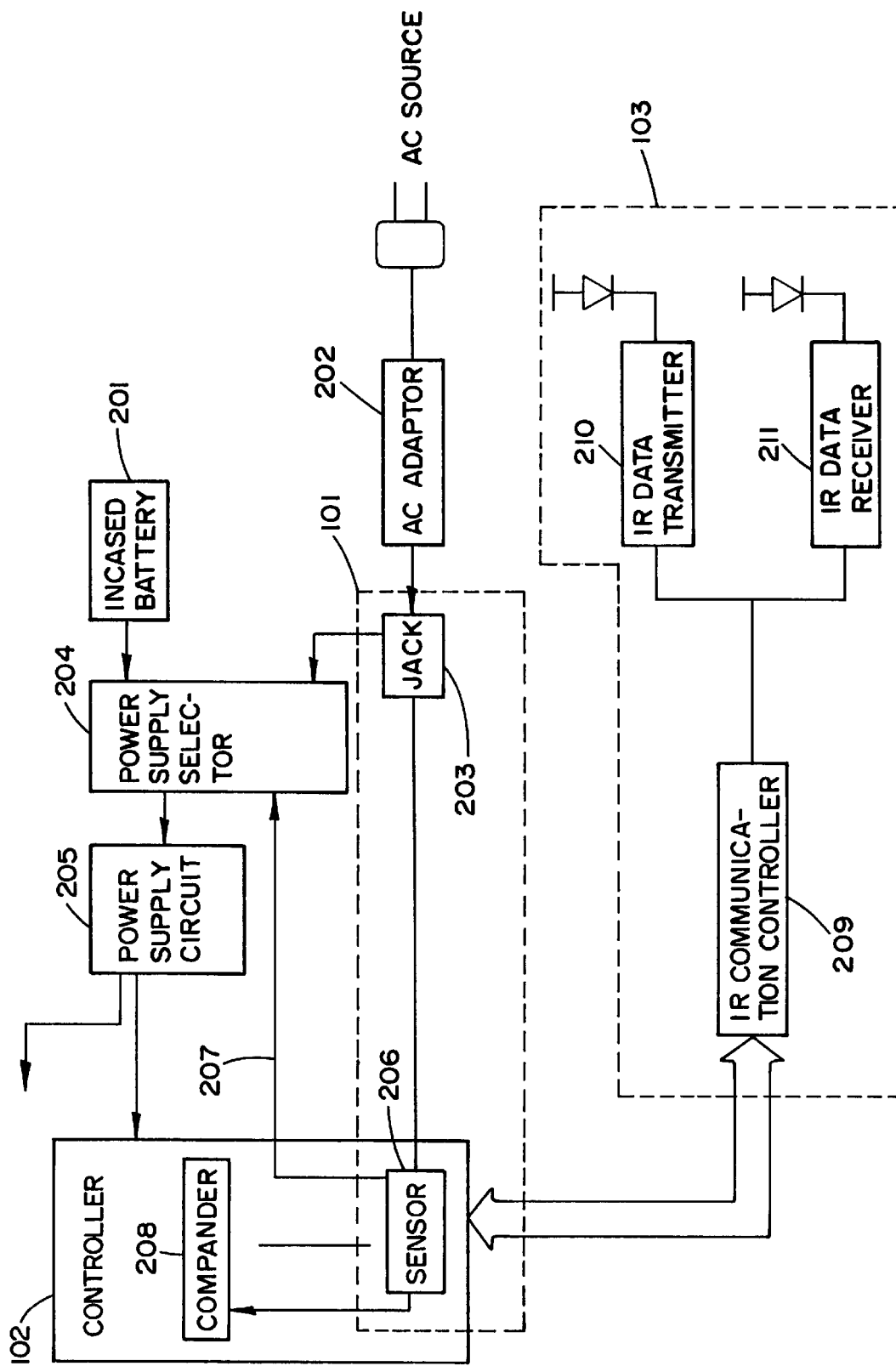
FIG. 2 is a detailed block diagram of a power supply detector, a controller, and an infrared communication unit of the portable information terminal shown in FIG. 1.

FIG. 2 shows in detailed block form the power supply detector 101, the controller 102, and the infrared communication unit 103.

As shown in FIG. 2, the portable information terminal can be powered by either a incased battery 201 or an AC power supply connected to an AC adapter 202.

The power supply detector 101 comprises a jack 203 to which the AC adapter 202 can be connected, and a sensor 206 in the controller 102. When an input current supplied to the jack 203 is detected by the sensor 206, the sensor 206 sends a control signal 207 to a power supply selector 204 which selects one of the electric energy supplied from the jack 203 and the electric energy supplied from the battery 201 for supply to a power supply circuit 205.

The controller 102 has a compander 208 for compressing data to be transmitted and expanding data which have been received, using the memory 104.

The infrared communication unit 103 has an infrared communication controller 209 for controlling the transmission of data to and the reception of data from another portable information terminal, an infrared data transmitter 210 for transmitting data to another portable information terminal, and an infrared data receiver 211 for receiving data from another portable information terminal.

The infrared data transmitter 210 has a light-emitting element such as a light-emitting diode (LED) or the like, and selectively turns on and off the light-emitting element depending on bits of data to be transmitted for thereby transmitting the data. For example, the infrared data transmitter 210 turns on the light-emitting element for transmitting a bit "1" of data, and turns off the light-emitting element for transmitting a bit "0" of data.

The infrared data receiver 211 has a light-detecting element such as a photodiode (PD) or the like, and receives infrared radiation transmitted from another portable information medium as data represented by a train of bits "1" and "0".

Operation of the portable information medium will be described below.

Figure 3:
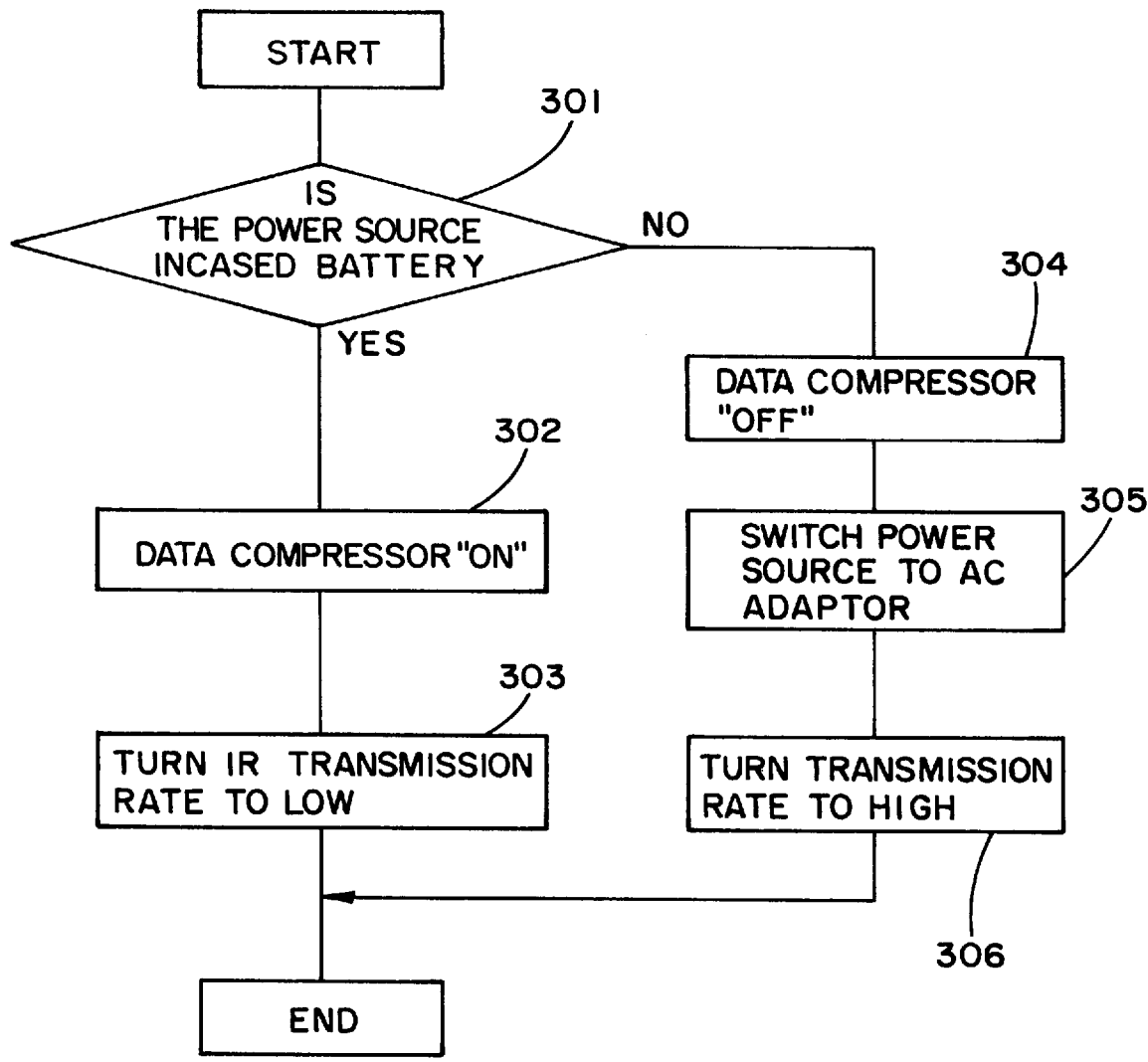
FIG. 3 is a flowchart of an operation sequence of the portable information terminal for detecting the type of a power supply.

FIG. 3 shows an operation sequence of the portable information terminal for detecting the type of a power supply.

The operation sequence of the portable information terminal for detecting the type of a power supply will be described below with reference to FIGS. 1 through 3. The power supply detector 101 and the controller 102 monitors the jack 203 with the sensor 206 to detect the type of a power supply connected to the portable information terminal. It is assumed that the portable information terminal is usually powered by the battery 201, and is switched from the battery 201 to the AC power supply when an input current supplied to the jack 203 is detected by the sensor 206.

When the portable information terminal starts to operate, the jack 203 is monitored by the sensor 206. If no input current supplied to the jack 203 is detected by the sensor 206 in a step 301 (FIG. 3), then it is determined that the portable information terminal is powered by the battery 201 (YES in the step 301), the compander 208 of the controller 102 is operated in a step 302, and the infrared communication controller 209 is set to effect communications at a low rate in a step 303.

If an input current supplied to the jack 203 is detected by the sensor 206 (NO in the step 301), then the compander 208 is not operated in a step 304, and the portable information terminal is switched from the battery 201 to the AC power supply in a step 305. Thereafter, the infrared communication controller 209 is set to effect communications at a high rate in a step 306.

After the portable information terminal has started to operate, the jack 203 is also monitored by the sensor 206 to detect whether the portable information terminal is switched from the battery 201 to the AC power supply or from the AC power supply to the battery 201. If power supply switching occurs, then the controller 102 controls the start and stop of the operation of compander 208, and setting of communication rate of infrared communication controller 209 in the manner described above.

Figure 4:
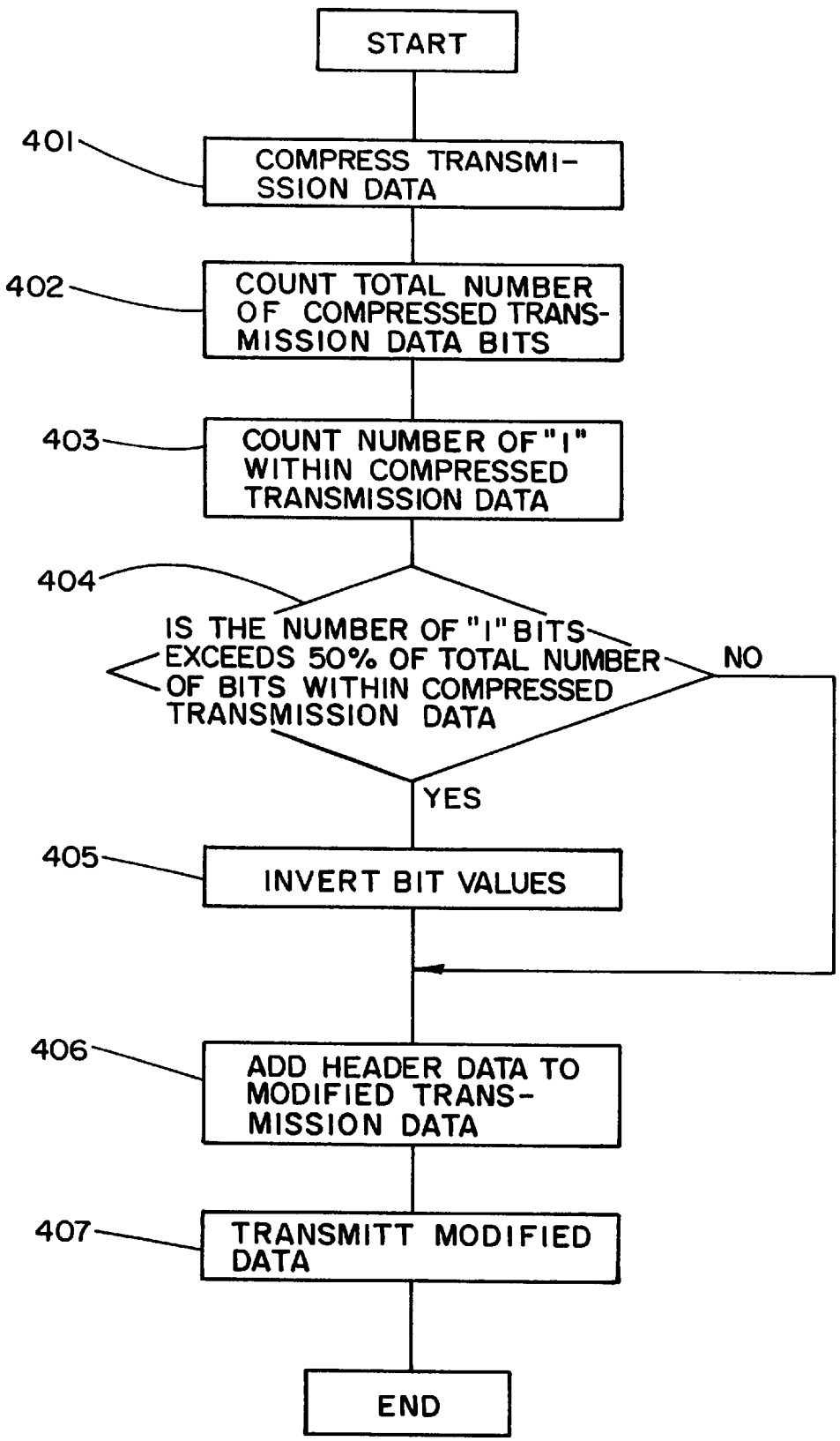
FIG. 4 is a flowchart of an operation sequence of the portable information terminal for transmitting data when the portable information terminal is powered by a battery.

FIG. 4 shows an operation sequence of the portable information terminal for transmitting data when the portable information terminal is powered by the battery 201.

The operation sequence of the portable information terminal for transmitting data when the portable information terminal is powered by the battery 201 will be described below with reference to FIGS. 1, 2, and 4.

The power supply detector 101 and the controller 102 monitors the jack 203 with the sensor 206 to detect the type of a power supply connected to the portable information terminal. If the portable information terminal is energized by the battery 201, then data to be transmitted by the infrared communication unit 103 are compressed by the compander 208 in a step 401.

The compander 208 has therein a dictionary for compressing data, and the data to be transmitted by the infrared communication unit 103 are compressed using the dictionary in the compander 208.

More specifically, the compander 208 searches the dictionary for a character or a string of characters contained in the data. If the compander 208 detects such a character or a string of characters in the dictionary, then the compander 208 compresses the data by replacing the character or the string of characters with a number in the dictionary. If the compander 208 does not detect such a character or a string of characters in the dictionary, then the compander 208 registers the character or the string of characters in the dictionary.

The compander 208 registers strings of characters comprising previous and present agreed strings of characters in the dictionary. When the dictionary is full, the compander 208 discards a string of characters which has not been used for a long period of time. The compander 208 manages the dictionary by managing each of strings of characters with a queue, and placing a string of characters at the end of a queue each time a string of characters is used.

Then, the controller 102 calculates the entire length of bits of the compressed data in a step 402, and then calculates the number of bits "1" in the compressed data in a step 403.

The controller 102 calculates the ratio of the bits "1" in the compressed data to the entire length of bits of the compressed data, and determines whether or not the bits "1" in the compressed data is 50% or more of the entire length of bits of the compressed data in a step 404. If the bits "1"

in the compressed data is 50% or more of the entire length of bits of the compressed data (YES in the step 404), then the controller 102 inverts the value of the bits of the compressed data, i.e., inverts the bits "1" in the compressed data into "bits "0", and the bits "0" in the compressed data into "bits "1", thereby producing data which will be transferred from the infrared communication unit 103 in a step 405.

If the bits "1" in the compressed data is less than 50% of the entire length of bits of the compressed data (NO in the step 404), then the controller 102 does not invert the value of the bits of compressed data.

Since the number of bits "0" in the compressed data is greater than the number of bits "1" in the compressed data, as a consequence, the entire period of time in which the light-emitting element of the infrared data transmitter 210 is turned on is reduced, thus effectively reducing the electric current consumed by the infrared data transmitter 210. If the infrared data transmitter 210 is arranged such that the light-emitting element emits light when the bits "0" are applied thereto, then the controller 102 inverts the value of the bits such that the number of bits "1" in the compressed data is greater than the number of bits "0" in the compressed data.

To the data which have been compressed, there are added header data representing that the data have been compressed and also representing whether a bit inverting process has been carried out or not in a step 406. The compressed data and the added header data make up data which will actually be transmitted from the infrared communication unit 103.

After the data have thus been processed for transmission from the infrared communication unit 103, the data are transmitted from the infrared data transmitter 210 to another portable information terminal under the control of the infrared communication controller 209 in a step 407.

If the portable information terminal is operated by the AC power supply or another other external power supply, then the data to be transmitted are not compressed and inverted, and will be transmitted with header data representing that the data have not been compressed and a bit inverting process has not been carried out.

The other portable information terminal which has received the transmitted data analyzes the added header data to determine whether the data have been compressed or not and also a bit inverting process has been carried out or not, and, if necessary, inverts again the value of the bits of the data to restore the original data and expand the compressed data.

As described above, when the portable information terminal is powered by the battery, since data to be transmitted are compressed and the data transmission rate is switched to a low rate, the electric current consumed by the portable information terminal for wireless data transmission through infrared radiation is reduced, and the period of time in which the portable information terminal can continuously be powered by the battery is extended.

Furthermore, inasmuch as data to be transmitted are compressed, they can be transmitted with a relatively high data transfer efficiency even if the data transmission rate is switched to a low rate.

In addition, the value of bits in the compressed data are inverted depending on the proportion of those bits, the electric current consumed by the portable information terminal for wireless data transmission through infrared radiation is further reduced, and the period of time in which the portable information terminal can continuously be powered by the battery is further extended.

It is to be understood that although the characteristics and advantages of the present invention have been set forth in the foregoing description, the disclosure is illustrative only, and changes may be made in the arrangement of the parts within the scope of the appended claims.

What is claimed is:

1. A method of carrying out data communications between transmitting and receiving portable information terminals through infrared radiation during which the transmitting terminal is operated with power fed by an incased battery, at a relatively low data transmission rate, the method comprising the steps of:
    (a) compressing data to be transmitted at said transmitting portable information terminal;
    (b) comparing the number of "0" bits contained in the compressed data and the number of "1" bits contained in the compressed data with each other;
    (c) inverting the value of bits if the number of bits which require a greater amount of electric energy for transmission is greater than the number of the other bits;
    (d) transmitting a modified content signal representing transmission data format, indicating that the transmission data is inverted if the bits have been so inverted at step (c) and compressed, to the receiving portable information terminal; and
    (e) expanding the compressed data and inverting back the inverted value of bits in response to said signal at the receiving portable information terminal.

2. The method according to claim 1, wherein said modified content signal representing the transmission data format is coded into a header data added to said compressed data, and said receiving portable information terminal decodes said coded header data.

3. An apparatus for carrying out data communications between transmitting and receiving portable information terminals through infrared radiation with an energy source which may be either an incased battery of limited capacity in each of the portable information terminals or an external power supply of unlimited capacity, the data communications being at a data transmission rate which is relatively low when the transmitting portable information terminal is operated by the battery, the apparatus comprising:
    a power supply detector for detecting whether the energy source is the incased battery or the external power supply:
        means for compressing data to be transmitted when the transmitting portable information terminal detects that the energy source is the incased battery;
        means for comparing the number of "0" bits contained in the compressed data and the number of "1" bits contained in the compressed data with each other;
        means for inverting the value of bits if the number of bits which require a greater amount of electric energy for transmission is greater than the other number of bits;
        means for transmitting the compressed data together with coded header data representing that the data has been compressed and whether the value of bits has been inverted or not when transmitting the data when the power source is the incased battery; and
        means for decoding the header data, expanding the compressed data, and inverting back the inverted value of bits in response to said received header data.

* * * * *

UNITED STATES PATENT AND TRADEMARK OFFICE
CERTIFICATE OF CORRECTION

PATENT NO. : 5,889,604
DATED : March 30, 1999
INVENTOR(S) : Keiichi Hayashi

It is certified that error appears in the above-identified patent and that said Letters Patent is hereby corrected as shown below:

On The Title Page, [56] References Cited: Insert --5,227,614  07/13/93 Danielson et al. and 5,682,157

10/28/97 Asmussen et al.--

Signed and Sealed this

Eighteenth Day of July, 2000

Attest:

Q. TODD DICKINSON

Attesting Officer              Director of Patents and Trademarks